United States Patent
Nagai et al.

(10) Patent No.: US 11,059,200 B2
(45) Date of Patent: Jul. 13, 2021

(54) HONEYCOMB STRUCTURE FORMING DIE AND METHOD OF MANUFACTURING HONEYCOMB STRUCTURE FORMING DIE

(71) Applicant: DENSO CORPORATION, Kariya (JP)

(72) Inventors: Nobuhiko Nagai, Kariya (JP); Koji Tamai, Kariya (JP)

(73) Assignee: DENSO CORPORATION, Kariya (JP)

( * ) Notice: Subject to any disclaimer, the term of this patent is extended or adjusted under 35 U.S.C. 154(b) by 141 days.

(21) Appl. No.: 16/544,430

(22) Filed: Aug. 19, 2019

(65) Prior Publication Data

US 2019/0366585 A1 Dec. 5, 2019

Related U.S. Application Data

(63) Continuation of application No. PCT/JP2018/000926, filed on Jan. 16, 2018.

(30) Foreign Application Priority Data

Feb. 24, 2017 (JP) .............................. JP2017-033408

(51) Int. Cl.
*B28B 3/26* (2006.01)
*B22F 5/10* (2006.01)
(Continued)

(52) U.S. Cl.
CPC ............... *B28B 3/269* (2013.01); *B22F 5/10* (2013.01); *B22F 10/20* (2021.01);
(Continued)

(58) Field of Classification Search
CPC ... B28B 3/269; B28B 2003/203; B22F 10/20; B22F 5/10; B22F 2999/00; B33Y 10/00; B33Y 80/00; B23P 15/243
See application file for complete search history.

(56) References Cited

U.S. PATENT DOCUMENTS

| | | |
|---|---|---|
| 5,066,215 A | 11/1991 | Peters et al. |
| 5,171,503 A | 12/1992 | Peters et al. |

(Continued)

FOREIGN PATENT DOCUMENTS

| | | |
|---|---|---|
| CN | 101670433 A | 3/2010 |
| JP | H0276717 A | 3/1990 |

(Continued)

*Primary Examiner* — Nahida Sultana
(74) *Attorney, Agent, or Firm* — Harness, Dickey & Pierce, P.L.C.

(57) ABSTRACT

A die includes a die body, a material supply portion, and a slit portion. The material supply portion includes a material supply surface, and a material supply hole that extends in an extrusion direction from the material supply hole. The slit portion includes an extrusion surface that faces the material supply surface across the material supply hole, and a slit that has a grid shape, opens on the extrusion surface, and communicates with the material supply hole. The slit has a grid point. The material supply hole is provided at a position corresponding to the grid point and coaxially with the grid point. An end of the material supply hole in the extrusion direction includes a throttle hole whose diameter decreases toward the grid point, and a guide hole that extends outward from the throttle hole and guides a material to the slit including the grid point.

6 Claims, 16 Drawing Sheets

(51) Int. Cl.
  *B22F 3/105* (2006.01)
  *B22F 10/20* (2021.01)
  *B33Y 10/00* (2015.01)
  *B33Y 80/00* (2015.01)
  *B28B 3/20* (2006.01)

(52) U.S. Cl.
  CPC ......... *B28B 2003/203* (2013.01); *B33Y 10/00* (2014.12); *B33Y 80/00* (2014.12)

(56) References Cited

U.S. PATENT DOCUMENTS

| | | | |
|---|---|---|---|
| 5,702,659 A * | 12/1997 | Kragle | B28B 3/269 264/177.11 |
| 6,551,151 B2 * | 4/2003 | Suzuki | H01R 13/055 439/866 |
| 6,991,450 B1 * | 1/2006 | Stephens, II | B29C 48/12 425/461 |
| 8,282,385 B2 * | 10/2012 | Ogata | B29C 48/11 425/461 |
| 8,337,191 B2 * | 12/2012 | Keller | B29C 48/34 425/461 |
| 2015/0137431 A1 | 5/2015 | Hayashi | |

FOREIGN PATENT DOCUMENTS

| | | |
|---|---|---|
| JP | H5131425 A | 5/1993 |
| JP | H9174657 A | 7/1997 |
| JP | 2002249805 A | 9/2002 |
| JP | 201596310 A | 5/2015 |
| JP | 2017159548 A | 9/2017 |

* cited by examiner

COMPARATIVE EXAMPLE

COMPARATIVE EXAMPLE

COMPARATIVE EXAMPLE

COMPARATIVE EXAMPLE

HONEYCOMB STRUCTURE FORMING DIE AND METHOD OF MANUFACTURING HONEYCOMB STRUCTURE FORMING DIE

CROSS REFERENCE TO RELATED APPLICATION

The present application is a continuation application of International Patent Application No. PCT/JP2018/000926 filed on Jan. 16, 2018, which designated the U.S. and claims the benefit of priority from Japanese Patent Application No. 2017-033408 filed on Feb. 24, 2017. The entire disclosures of all of the above applications are incorporated herein by reference.

TECHNICAL FIELD

The present disclosure relates to a honeycomb structure forming die, and a method of manufacturing the honeycomb structure forming die.

BACKGROUND

A honeycomb structure which is used for a catalyst or the like which purifies exhaust gas of an automobile generally has a columnar shape, and has an inside partitioned by cell walls. The honeycomb structure thus configured has a plurality of cells extending in parallel to each other in an axial direction of the honeycomb structure. For example, the cell walls have a grid shape corresponding to a cell shape (rectangular shape) in a cross section perpendicular to the axial direction, and have a grid size corresponding to a desired cell density. The honeycomb structure is usually manufactured by extruding a ceramic material using a die which includes a slit having a grid shape and material supply holes communicating with the slit. For example, the slit of the die is formed by electrical discharge machining using a grid-shaped discharge electrode, while the material supply holes are formed by drilling.

In recent years, weight reduction of a honeycomb structure has been promoted for early activation of a catalyst which purifies exhaust gas. Each cell wall of the honeycomb structure therefore has a reduced thickness. However, thickness reduction of the cell walls of the honeycomb structure easily causes twists of the cell walls and bends of the honeycomb structure. In this case, uniform control of a supply speed of the material to the slit and an extrusion speed from the slit may be difficult to achieve. Accordingly, there may be a limit on weight reduction of the honeycomb structure achievable by thickness reduction of the cell walls of the honeycomb structure. Moreover, a molding speed needs to lower in order that molding accuracy increases. In this case, productivity may decrease.

SUMMARY

According to an aspect of the present disclosure, a honeycomb structure forming die is used for extrusion molding of a honeycomb structure that has cells partitioned by cell walls. The honeycomb structure forming die includes a die body, a material supply portion, and a slit portion. The material supply portion includes a material supply surface that forms one surface of the die body, and a material supply hole that extends in an extrusion direction from the material supply surface. The slit portion includes an extrusion surface that faces the material supply surface across the material supply hole, and a slit that has a grid shape, opens on the extrusion surface, and communicates with the material supply hole inside the die body. The slit has a grid point. The material supply hole is provided at a position corresponding to the grid point and coaxially with the grid point. An end of the material supply hole in the extrusion direction includes a throttle hole whose diameter decreases toward the grid point, and a guide hole that extends outward from the throttle hole and guides a material to the slit including the grid point.

According to another aspect of the present disclosure, a method of manufacturing the honeycomb structure forming die in which a material supply hole and a slit are formed includes laying metal powder on a pedestal, and applying a laser beam to the metal powder to melt and solidify the metal powder in an area other than portions corresponding to the material supply hole and the slit.

BRIEF DESCRIPTION OF THE DRAWINGS

These and other objects, features and advantages of the present disclosure will become more apparent from the following detailed description with reference to the accompanying drawings.

EMBODIMENTS

Figure 1:
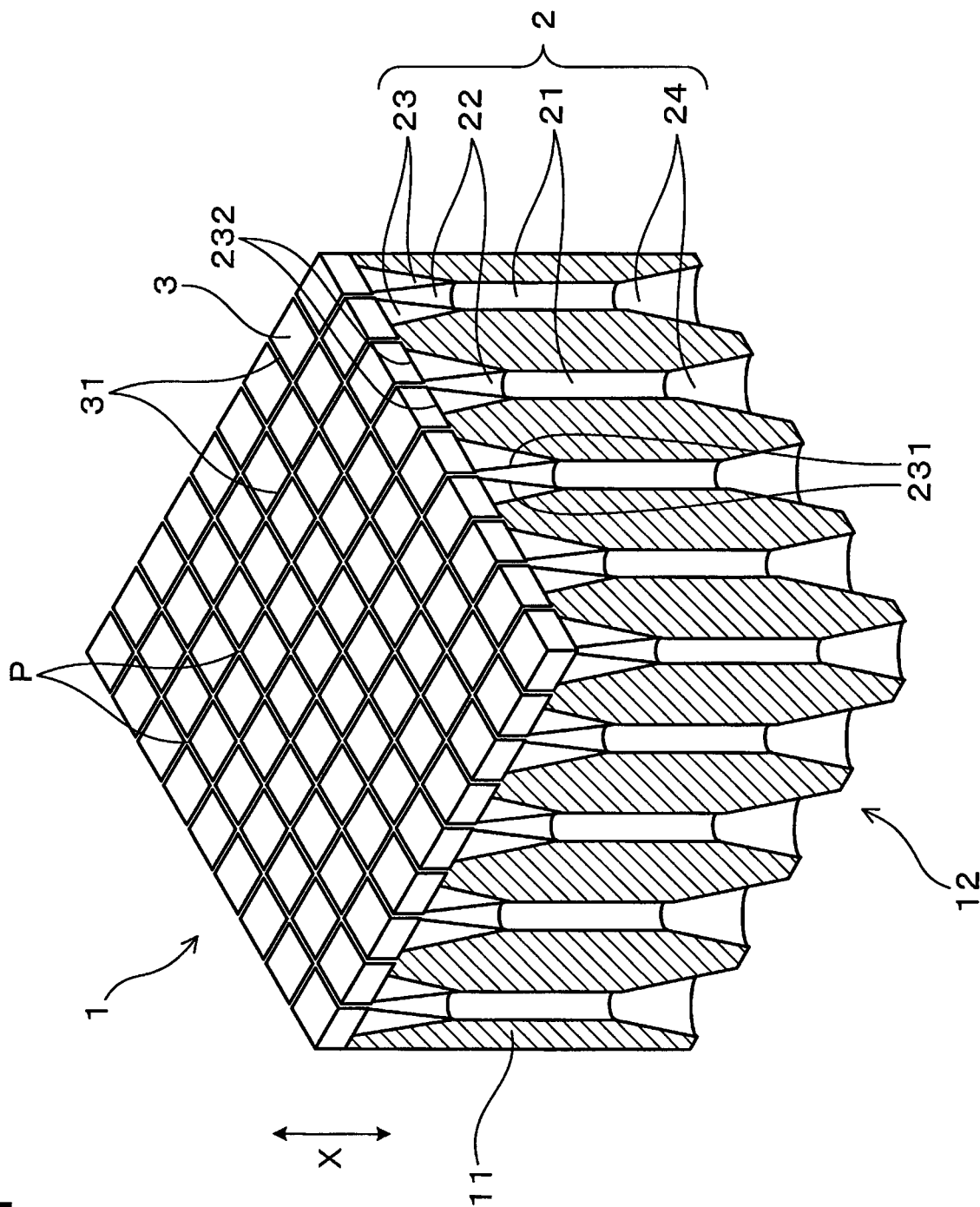
FIG. 1 is a perspective view schematically showing a partial structure of a honeycomb structure forming die according to a first embodiment.

Firstly, a conventional extrusion die will be described. The conventional extrusion die includes a supply section having a plurality of supply holes through which a material is supplied, a discharge section having a discharge opening through which the material is discharged as a honeycomb structure, and a transition section disposed between these two sections. The transition section is constituted by a plurality of laminated thin transition layers. Each of the transition layers has an opening. The plurality of transition layers are laminated such that the openings are located coaxially with each other. In this manner, the respective openings of the transition layers form a pipe inside the transition section. Each of the transition layers has a plurality of openings forming a plurality of pipes within the transition section. The material supplied from the supply section and flowing through the extrusion die is delivered to the discharge section while branching or changing directions inside each of the plurality of pipes, or changing a cross-sectional shape.

This extrusion die reduces extrusion pressure by distributing a flow direction of the material flowing toward the discharge section to directions not parallel to the axis of the flow in the transition section. However, a step is formed between the adjoining openings in the transition section formed by laminating the plurality of transition layers. The steps decrease as the transition layers are thinner and the number of transition layers increases. However, in the presence of requirement of high processing accuracy of the openings and high lamination accuracy (assembly accuracy) of the transition layers, entire inner wall surfaces of the plurality of pipes and a plurality of branch pipes each branched from the corresponding one of the plurality of pipes may be difficult to shape into smooth surfaces. Accordingly, the ceramic material is caught by the inner wall surfaces during passage of the ceramic material through the pipes and the branch pipes, for example, under which condition a molding speed difference may be produced between adjoining regions. In this case, uniform extrusion molding may be difficult to achieve.

Embodiments for carrying out the present disclosure will be hereinafter described with reference to the drawings. In the respective embodiments, parts corresponding to matters already described in the preceding embodiments are given reference numbers identical to reference numbers of the matters already described. The same description is therefore omitted depending on circumstances. When only a part of a configuration is described in any of the embodiments, the remaining part of this configuration is similar to the corresponding part described in the preceding embodiments.

First Embodiment

A honeycomb structure forming die and a method for manufacturing the honeycomb structure forming die according to a first embodiment will be described with reference to FIGS. 1 to 11, 14A, 14B, 16 and 17. The honeycomb structure forming die (hereinafter referred to as a die) is used to manufacture a honeycomb structure by extrusion molding using a ceramic material, for example.

Figure 2A:
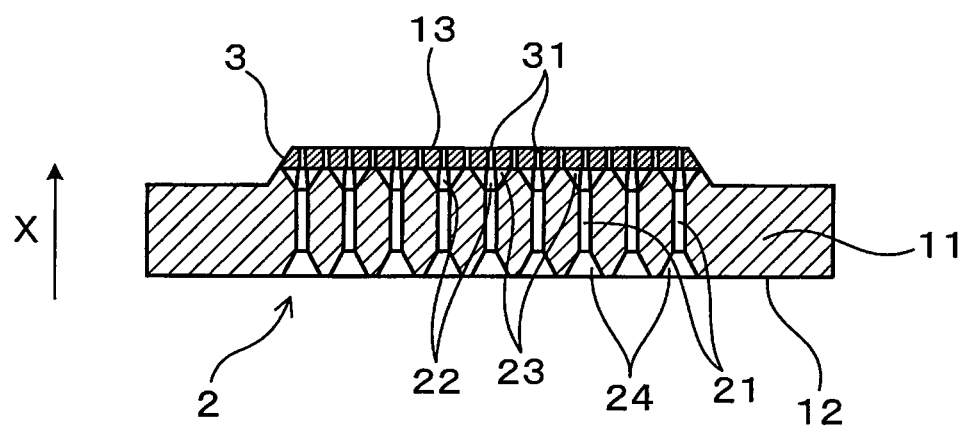
FIG. 2A is a cross-sectional view showing an entire configuration of the honeycomb structure forming die according to the first embodiment.
Figure 2B:
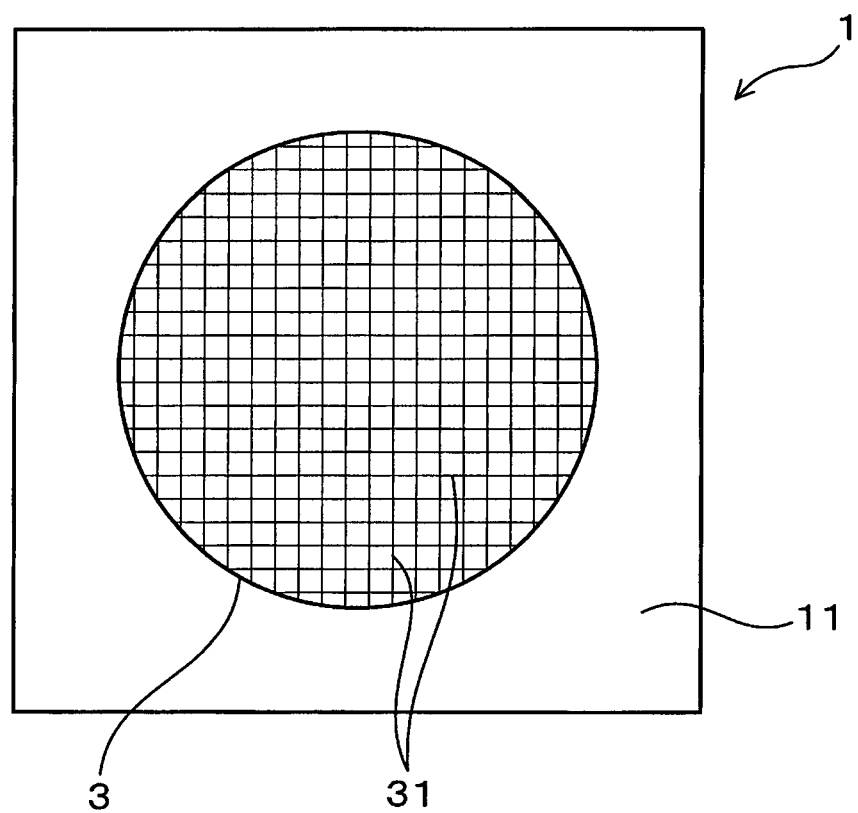
FIG. 2B is a top view of the honeycomb structure forming die shown in FIG. 2A.

As shown in FIG. 1, FIG. 2A, FIG. 2B and FIG. 3, a die 1 according to the present embodiment includes one die body 11. As shown in FIGS. 2A and 2B, the die body 11 is a plate-shaped component having a rectangular external shape in a cross section. The die body 11 includes a material supply portion 2 having a material supply surface 12, and a slit portion 3 having an extrusion surface 13. The material supply surface 12 and the extrusion surface 13 face each other in a thickness direction of the die body 11.

The material supply portion 2 includes a plurality of material supply holes 21 extending in the thickness direction of the die body 11, and a plurality of throttle holes 22 and a plurality of guide holes 23 each formed at ends of the plurality of material supply holes 21 on the side close to the extrusion surface 13. The slit portion 3 includes a slit 31 having a grid shape. The plurality of material supply holes 21 communicate with the slit 31. Each of the plurality of throttle holes 22 has a diameter decreasing toward corresponding one of a plurality of grid points P of the slit 31. Each of the plurality of guide holes 23 expands outward from the corresponding one of the plurality of throttle holes 22 to guide supply of a material to the slit 31 continuing to the grid point P.

A direction parallel to the thickness direction and extending from the material supply surface 12 to the extrusion surface 13 will be hereinafter referred to as an extrusion direction X. The material supply portion 2 and the slit portion 3 are disposed at a central portion of a plate surface of the die 1. An external shape of the slit portion 3 corresponds to an external shape of a honeycomb structure H. A grid shape defined by the slit 31 corresponds to a shape formed by a plurality of cells C. The die body 11 includes the material supply portion 2 and the slit portion 3 formed integrally with each other, and can be manufactured using a 3D printer as described below, for example.

Figure 4:
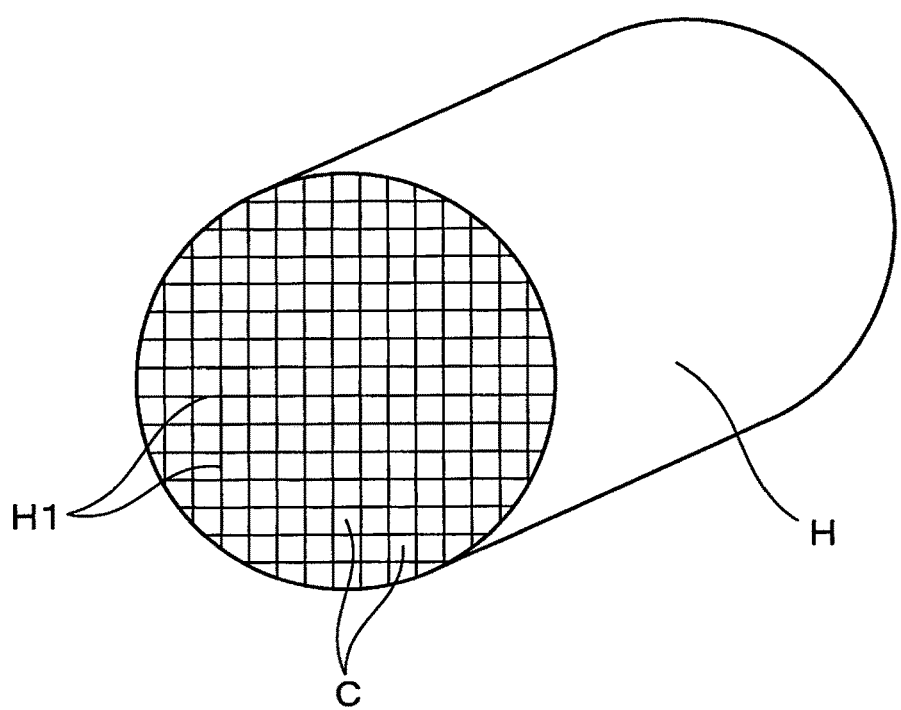
FIG. 4 is a perspective view showing an entire structure of a honeycomb structure according to the first embodiment.

As shown in FIG. 4, the honeycomb structure H has a cylindrical shape. An inside of the honeycomb structure H is partitioned into the plurality of cells C by a plurality of cell walls H1 continuous in a honeycomb shape. Shape and size of each of the plurality of cells C may be set to any shape and size. According to the present embodiment, each of the plurality of cells C has a square shape, and has an equal size throughout a cross section perpendicular to an axial direction of the honeycomb structure H. Each of the plurality of cells C may have a polygonal shape having three or more corners. Alternatively, the plurality of cells C may be cells having a plurality of different shapes. The sizes of the plurality of cells C may be changed for each set of regions divided in a circumferential direction. Cell density of the plurality of cells C on the inner peripheral side may be different from cell density of the plurality of cells C on the outer peripheral side.

Figure 3:
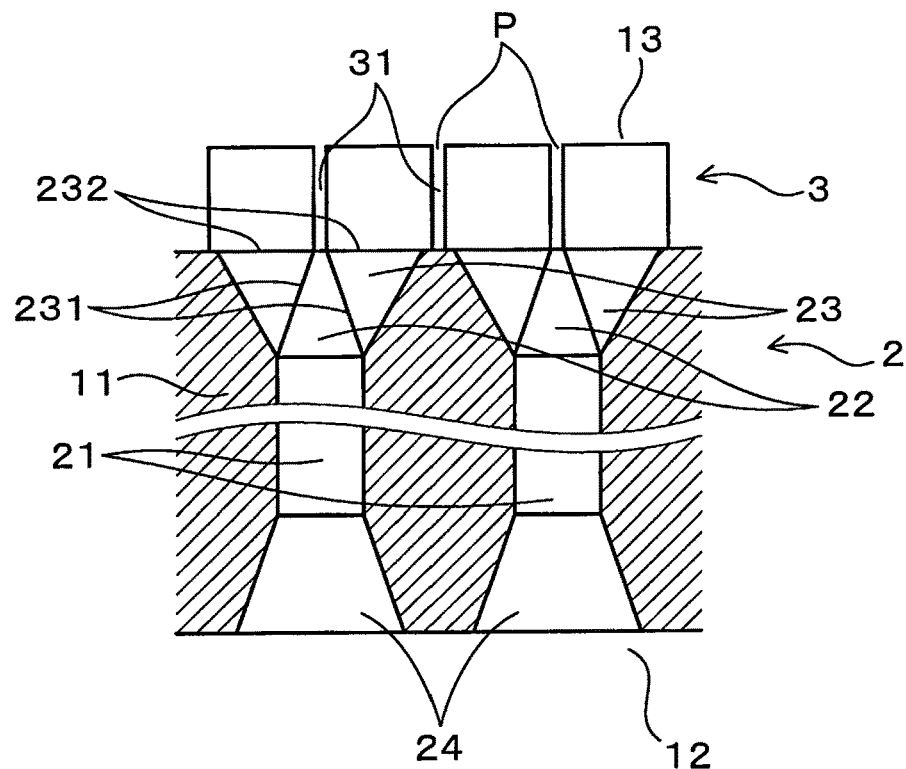
FIG. 3 is an enlarged cross-sectional view showing a partial internal shape of the honeycomb structure forming die shown in FIGS. 2A and 2B.

As shown in FIGS. 1 and 3, the material supply portion 2 has the plurality of material supply holes 21 each of which has one end (i.e., lower end in FIG. 3) opening to the material supply surface 12 and extending in the extrusion direction X. The plurality of material supply holes 21 have the same shape in a cross section perpendicular to the thickness direction, and are disposed parallel to each other at equal intervals. Accordingly, the ceramic material can be uniformly supplied from the plurality of material supply holes 21 to predetermined positions of the slit portion 3. Each of the plurality of material supply holes 21 is a circular hole having a fixed diameter except for both ends of the material supply holes 21 in the thickness direction. Rigidity of the die body 11 improves by increasing a flow path length of each of the plurality of material supply holes 21, in other words, a length of each of the material supply holes 21 in the thickness direction. Accordingly, deformation of the die body 11 caused by a higher molding pressure can decrease. Each of the plurality of material supply holes 21 has a smooth inner surface. A coefficient of friction with the ceramic material decreases as the inner surface becomes smoother. At a lower coefficient of friction, a molding speed increases, wherefore abrasion of the inner surface caused by the friction with the ceramic material decreases. One of the plurality of material supply holes 21 will be hereinafter described as a representative of the material supply holes 21 each having the same configuration.

The material supply portion 2 includes supply taper holes 24 each connected to the corresponding material supply hole 21. The number of the material supply holes 21 is equal to the number of the supply taper holes 24. Accordingly, a plurality of the supply taper holes 24 are formed in the present embodiment. One end (lower end in FIG. 3) of the supply taper hole 24 in the thickness direction opens at the material supply surface 12, while the other end (upper end in FIG. 3) in the thickness direction is connected to the material supply hole 21. The diameter of the supply taper hole 24 is expanded from the material supply hole 21 toward the material supply surface 12. In other words, the diameter of the supply taper hole 24 decreases in the extrusion direction X. The supply taper hole 24 is defined by a taper wall smoothly continuing to a cylindrical inner circumferential wall forming the material supply hole 21. The ceramic material introduced from the material supply surface 12 is delivered to the material supply hole 21 through the supply taper hole 24. The supply taper hole 24 thus formed can decrease an area of the material supply surface 12 perpendicularly contacting the ceramic material, and lower a loss coefficient caused by friction with the material supply surface 12. Accordingly, reduction of deformation of the die body 11 and increase in the molding speed are achievable.

A flow path length and a taper angle of the supply taper hole 24 can be set to appropriate values allowing the rigidity of the die body 11, molding speed, and the like to fall within desired ranges. When reduction of deformation during molding and a sufficient molding speed are secured at a sufficiently small coefficient of friction between the die body 11 and the ceramic material, the supply taper holes 24 may be eliminated.

The end of the material supply hole 21 on the side opposite to the material supply surface 12, i.e., the end close to the extrusion surface 13, is connected to the throttle hole 22 which has a tapered shape having a diameter decreasing toward the slit portion 3, i.e., in the extrusion direction X. The end of the throttle hole 22 on the side opposite to the material supply hole 21 opens at the grid point P of the slit 31. The plurality of guide holes 23 are provided outside the throttle holes 22. The plurality of guide holes 23 communicate with the throttle hole 22, and guide the ceramic material to the slit 31 extending from the grid point P.

Each of the plurality of guide holes 23 is shaped such that a cross-sectional area increases in the extrusion direction X. More specifically, the plurality of guide holes 23 are flat holes each having an inverted triangular shape in a cross section parallel to an axial direction of the material supply hole 21, i.e., the thickness direction. According to the present embodiment, the number of the plurality of guide holes 23 is four. In each of two pairs of the guide holes 23, paired guide holes are disposed symmetrically with respect to a direction perpendicular to the axial direction, and face each other with the throttle hole 22 interposed between the corresponding guide holes 23. One side included in each of the plurality of guide holes 23 and connected to the throttle hole 22 constitutes a first opening 231 for leading out material. The first opening 231 opens at the tapered inner wall surface of the throttle hole 22 to communicate with the throttle hole 22, and guides the ceramic material outward. One side included in each of the plurality of guide holes 23 and connected to the slit portion 3 constitutes a second opening 232 for material distribution. The second opening 232 opens to the slit 31.

According to the present embodiment, each of the plurality of cells C has a square shape in a cross section perpendicular to the axial direction of the honeycomb structure H. Accordingly, the slit 31 of the slit portion 3 defines a quadrangular grid. The slit 31 has a constant shape in the thickness direction, and determines a final shape of the honeycomb structure H. For example, a grid interval and a slit width of the slit 31 are set in accordance with the pitches of the plurality of cells C and the thickness of the cell wall H1. For example, the slit 31 may have a height set substantially equivalent to the grid interval of the slit 31.

Figure 5:
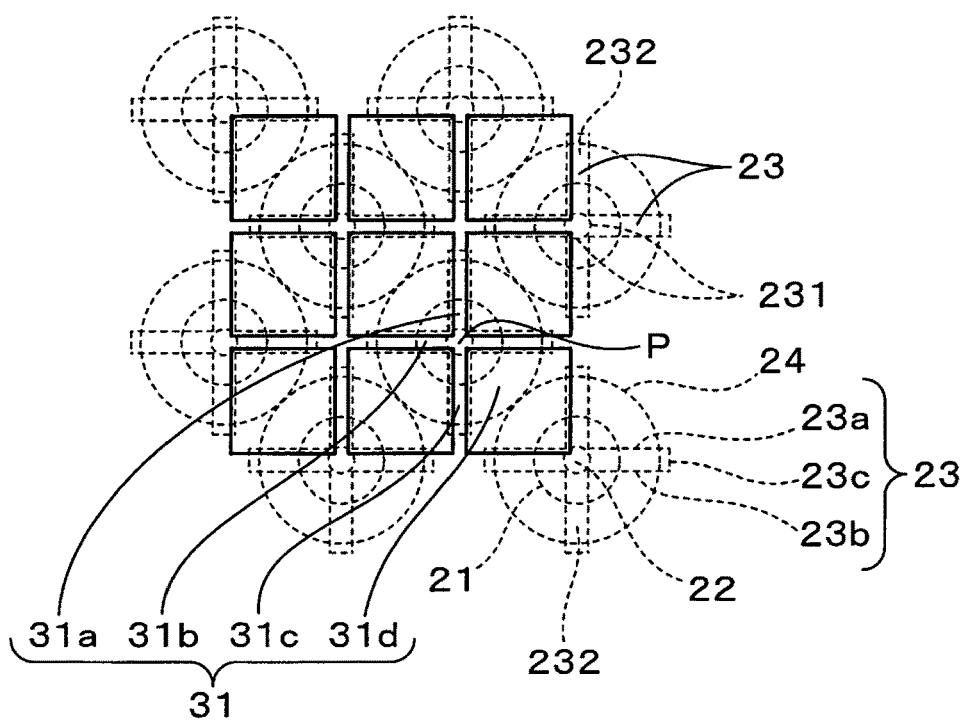
FIG. 5 is a view showing a slit portion and a material supply portion of the honeycomb structure forming die according to the first embodiment.
Figure 6:
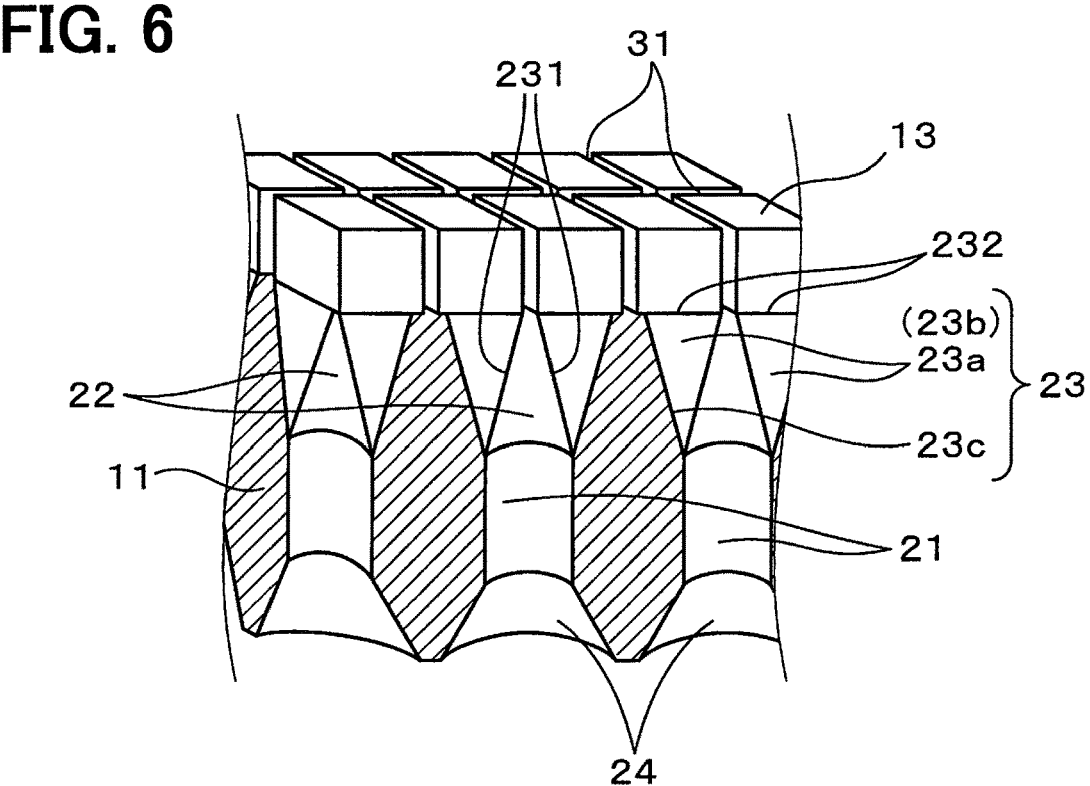
FIG. 6 is a perspective view showing a configuration example of the slit portion and the material supply portion shown in FIG. 5.

For example, as shown in FIG. 5 and FIG. 6, the material supply holes 21 are disposed at every other point of the plurality of grid points P of the slit 31 in the longitudinal direction and the lateral direction. The throttle hole 22 opens at the grid point P, while the material supply hole 21 is located concentrically with the supply taper hole 24. For example, the outer diameter of the supply taper hole 24 may be approximately equal to or smaller than the diagonal length of each grid shape of the slit 31. The distance between the adjoining supply taper holes 24 decreases as the outer diameter increases. This configuration can efficiently supply the ceramic material, lower the loss coefficient of the ceramic material during introduction into the supply taper hole 24, reduce deformation of the die 1, and increase the molding speed.

Four slit grooves 31a, 31b, 31c, and 31d radially extend from each of the grid points P of the slit 31. The four slit grooves 31a, 31b, 31c, and 31d are symmetrically disposed around the corresponding grid point P. According to the present embodiment, the four guide holes 23 communicate with the throttle hole 22, and extend outward from an outer circumferential surface of the throttle hole 22. The four guide holes 23 radially extend from the throttle hole 22 along the four slit grooves 31a, 31b, 31c, and 31d. Each of the four guide holes 23 has the first opening 231 extending in the thickness direction along the throttle hole 22 and communicating with the throttle hole 22, and the second opening 232 opening at the slit 31. Specifically, the four second openings 232 open to the four slit grooves 31a, 31b, 31c, and 31d, respectively.

Each of the four guide holes 23 is defined by a pair of surfaces 23a and 23b facing each other with the corresponding one of the slit grooves 31a, 31b, 31c, and 31d interposed between the surfaces 23a and 23b, and an inclined surface 23c connecting the pair of surfaces 23a and 23b on the side opposite to the throttle hole 22. Each of the plurality of guide holes 23 has a flat hole shape. Each width of the pair of surfaces 23a and 23b increases in the extrusion direction X. More specifically, each of the pair of surfaces 23a and 23b has an inverted triangular shape.

Each height of the plurality of guide holes 23 is equivalent to the height of the throttle hole 22. The first opening 231 faces the inclined surface 23c, and opens to the throttle hole 22 throughout the length of the corresponding guide hole 23. For example, the pair of surfaces 23a and 23b are disposed in parallel to each other to form a slit-shaped hole between the pair of surfaces 23a and 23b. The slit-shaped hole has a width equal to or slightly larger than the width of the slit 31. The second opening 232 connected to the slit 31 is formed at an extension end of each of the plurality of guide holes 23. An outermost edge of the second opening 232 extends between the two adjoining grid points P.

For example, each of the plurality of guide holes 23 is shaped to have a width smoothly increasing from the material supply hole 21 toward the slit 31 to further reduce molding resistance. When the width of the slit 31 changes for each region, for example, the width of the guide hole 23 changes in correspondence with the width of the slit 31. This configuration achieves uniform supply of the ceramic material to each region of the slit 31, thereby producing a highly accurate die body. The size of the opening of the throttle hole 22 communicating with the material supply hole 21 may be changed in accordance with the width of the slit 31 at the corresponding grid point P. This configuration produces effects similar to the effects of the configuration in which the width of the guide hole 23 is changed.

Figure 7:
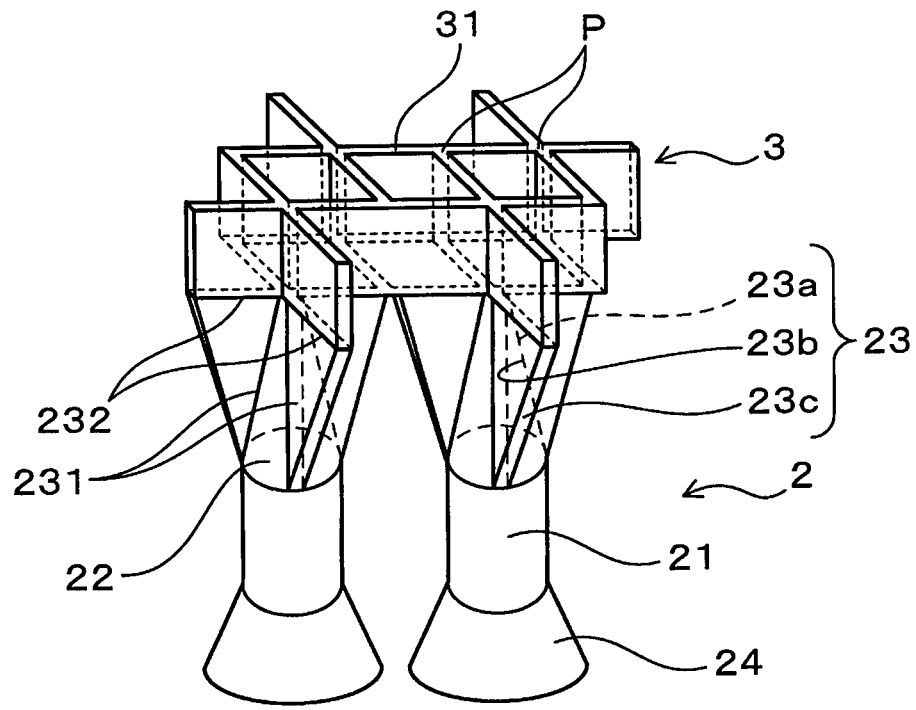
FIG. 7 is a perspective view showing the internal shape of the honeycomb structure forming die shown in FIG. 3.

FIG. 7 shows internal shapes of the material supply portion 2 and the slit portion 3. More specifically, FIG. 7 shows a three-dimensional shape of the ceramic material which passes through the material supply portion 2 and the slit portion 3. As shown in FIG. 7, a part of the ceramic material introduced from the supply taper hole 24 through the material supply hole 21 into the throttle hole 22 is guided by the four guide holes 23 and gradually spreads sideward. More specifically, surplus ceramic material is transferred outward from the first opening 231 of each of the four guide holes 23 toward an internal space of each of the guide holes 23, and guided toward the slit 31 radially extending from the grid point P in accordance with reduction of the diameter of the throttle hole 22 toward the grid point P of the slit 31. Accordingly, the ceramic material can be distributed toward the slit 31 in a route to the second opening 232 of each of the four guide holes 23, and therefore can be uniformly supplied to the substantially entire slit 31. As a result, the honeycomb structure H is easily obtained by extrusion molding along the shape of the slit 31.

Figure 8:
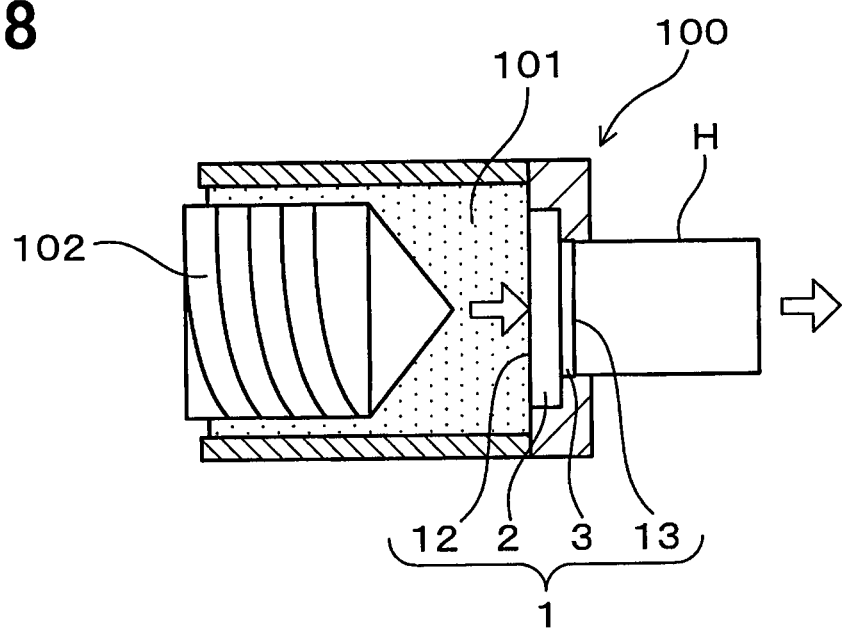
FIG. 8 is a schematic cross-sectional view showing a configuration of a molding apparatus for forming the honeycomb structure according to the first embodiment.

For extrusion molding of the honeycomb structure H using the die 1, the die 1 is placed on an end face of an extrusion molding apparatus 100 in the extrusion direction X such that the slit portion 3 is positioned on the outside as shown in FIG. 8, and then a ceramic material 101 is supplied to the die 1. A screw 102 is provided inside the extrusion molding apparatus 100 on the supply side end surface facing the material supply surface 12 of the die 1. The screw 102 extrudes the ceramic material 101, which is a clay-like material, in the extrusion direction X as indicated by an arrow to supply the ceramic material 101 to the die 1. The ceramic material 101 consequently passes through the slit portion 3, and is extruded from the extrusion surface 13 to become the honeycomb structure H. For example, the ceramic material 101 is a material which generates cordierite, SiC, or the like when fired.

Figure 9:
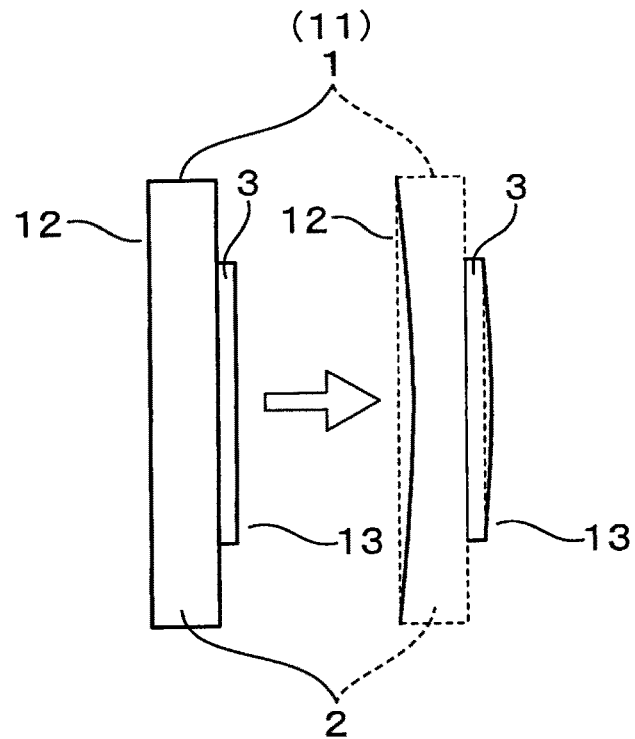
FIG. 9 is a schematic diagram showing a die shape in a forming step of the honeycomb structure according to the first embodiment.

During extrusion molding, a high molding pressure is applied to the material supply surface 12 of the die 1. In this case, a central portion through which the ceramic material passes is easily deformed and protrudes in the extrusion direction X as shown in FIG. 9. Accordingly, reduction of deformation by lowering the molding pressure has been conventionally required. According to the die 1 of the present embodiment, however, the flow of the ceramic material from the material supply portion 2 to the slit portion 3 is highly controlled using the throttle hole 22 and the four guide holes 23. In this manner, the molding pressure is allowed to increase while reducing the deformation of the die body 11. The flow of the ceramic material during extrusion molding will be next described.

Figure 10:
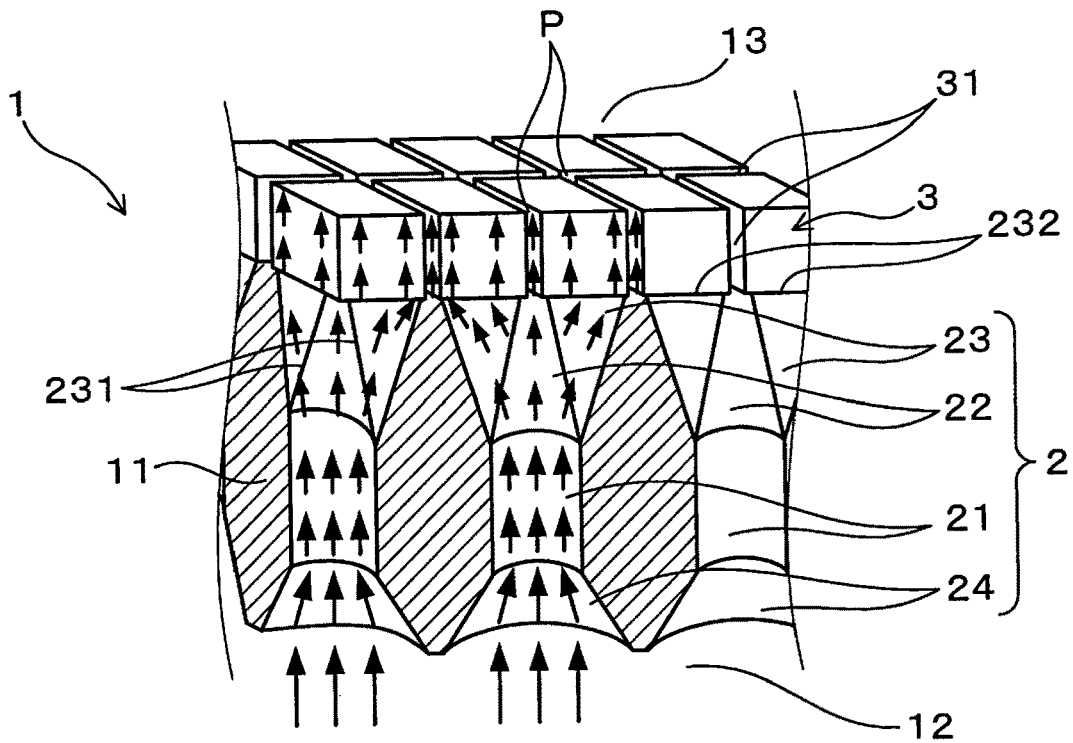
FIG. 10 is a schematic perspective view for explaining a flow of a material in the forming step of the honeycomb structure shown in FIG. 9.
Figure 11:
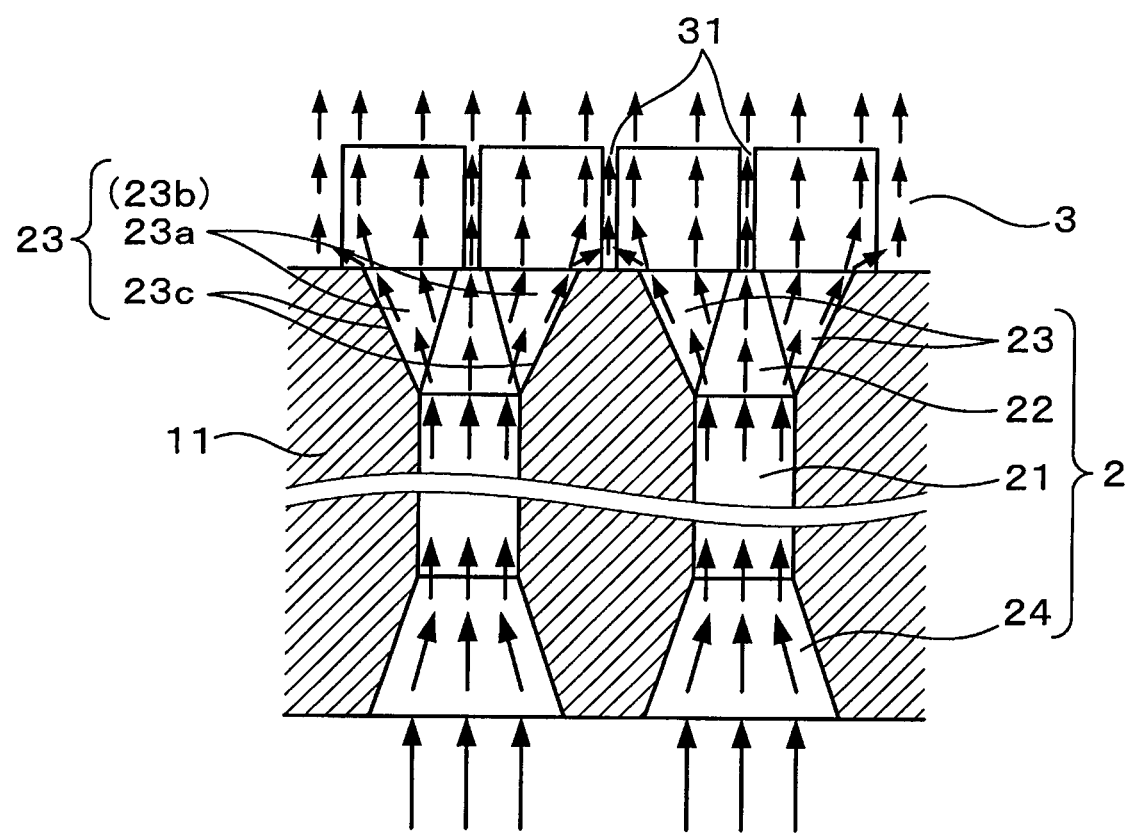
FIG. 11 is a schematic cross-sectional view for explaining the flow of the material shown in FIG. 10.

As shown in FIGS. 10 and 11, the material supply portion 2 has the supply taper hole 24 opening at the material supply surface 12. Accordingly, a perpendicular contact area of the ceramic material decreases. The ceramic material introduced into the supply taper hole 24 is delivered to the material supply hole 21 along the tapered inner wall surface, rapidly passes through the material supply hole 21, and travels toward the throttle hole 22. The ceramic material travels toward the grid point P of the slit 31 while gradually narrowed along the tapered inner wall surface of the throttle hole 22. In addition, a part of the ceramic material on the outer circumferential side is introduced into the internal spaces of the four guide holes 23 opening to the inner wall surface. Each of the guide holes 23 guides the ceramic material, which flows into the internal space formed between the pair of surfaces 23a and 23b as flat surfaces, gradually outward along the inclined surface 23c.

The second opening 232 of each of the four guide holes 23 opens to the slit 31 extending between the two adjoining grid points P. More specifically, the four second openings 232 open to the four slit grooves 31a, 31b, 31c, and 31d, respectively. In this configuration, the ceramic material having passed through the throttle hole 22 and the guide holes 23 rapidly flows into the four slit groove 31a, 31b, 31c, and 31d. The grid point P where the throttle hole 22 is not disposed communicates, via the slit 31, with the grid point P where the adjoining throttle hole 22 is disposed. Accordingly, the ceramic material having passed through the four slit grooves 31a, 31b, 31c, and 31d extending from the adjoining grid point P flows into the grid point P where the throttle hole 22 is not disposed.

The inner wall surfaces of the supply taper hole 24, the material supply hole 21, the throttle hole 22, and the four guide holes 23 are all smooth curved surfaces or flat surfaces. The inner wall surface of the supply taper hole 24 is smoothly and seamlessly connected to the inner wall surface of the material supply hole 21, while the inner wall surface of the material supply hole 21 is smoothly and seamlessly connected to the inner wall surface of the throttle hole 22 and the inner wall surface of each of the four guide holes 23. Accordingly, the ceramic material smoothly flows inside the material supply portion 2 without any catch or stay. In this manner, the ceramic material is distributed to the entire slit 31 and supplied to the entire slit portion 3 without delay while passing through the material supply portion 2. The ceramic material having reached the slit portion 3 is uniformly extruded from the slit 31 without change. This configuration therefore considerably improves moldability, and increases the molding speed while reducing deformation of the die 1, thereby achieving both quality improvement and productivity.

Figure 12:
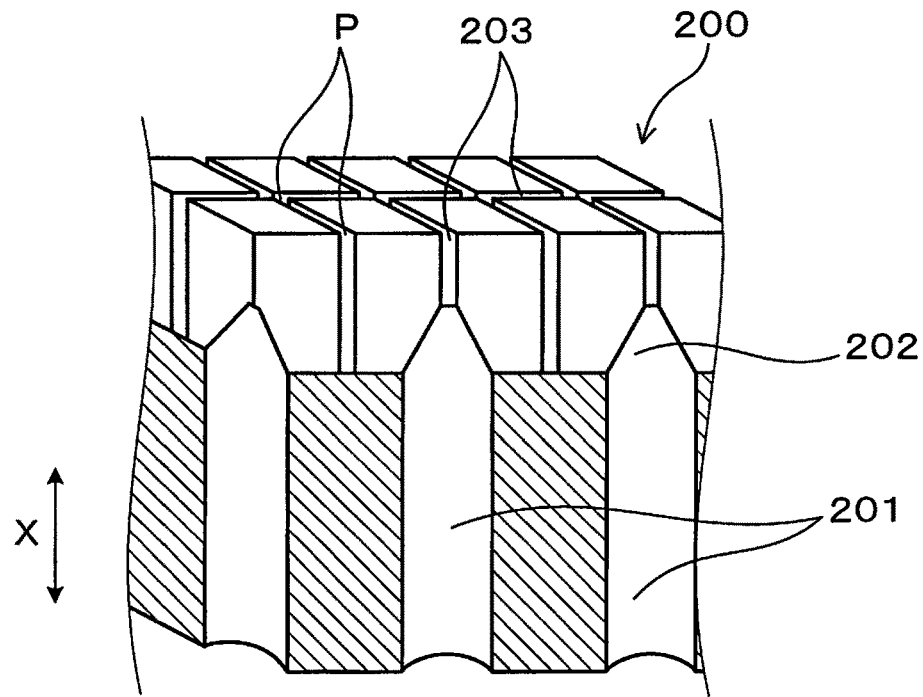
FIG. 12 is a perspective view showing a partial configuration example of a honeycomb structure forming die according to a comparative example.
Figure 13:
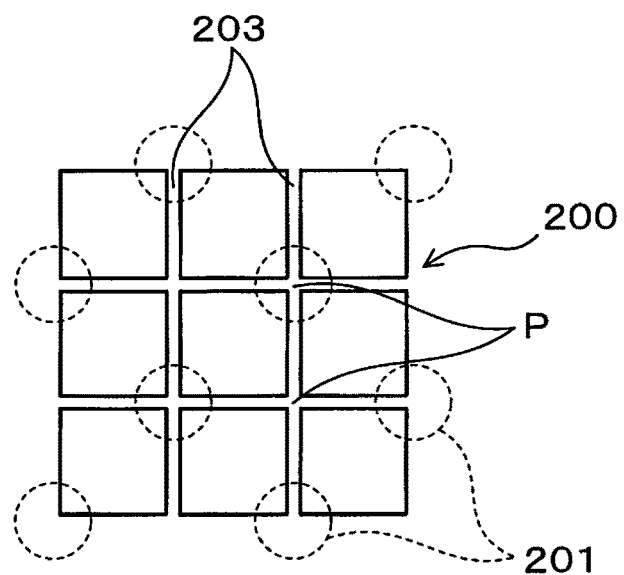
FIG. 13 is a plan view showing the honeycomb structure forming die shown in FIG. 12.

Each of FIGS. 12 and 13 shows a die 200 which is a conventional die in a comparative example. According to the die 200, a material supply hole 201 having a fixed diameter is connected to a grid point P of a slit 203 via an end 202 having a tapered shape. Accordingly, the ceramic material does not flow uniformly. In this example, the material supply hole 201 is connected to every other point of the grid points P of the slit 203. In this case, the ceramic material is difficult to uniformly distribute from the end 202 having a round hole shape to the entire slit 203 having a grid shape. Accordingly, it is required to set a sufficiently large length of the slit 203 in the thickness direction, or to decrease the molding speed.

Figure 14A:
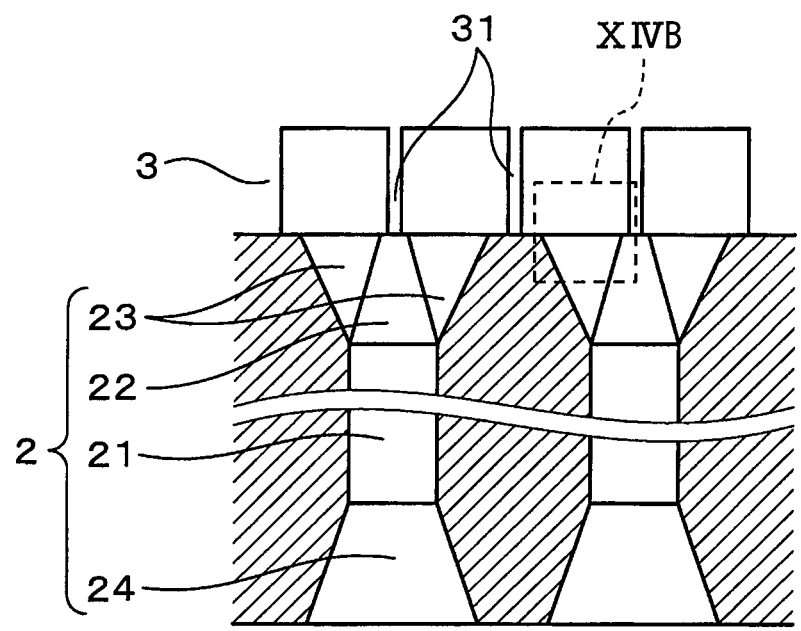
FIG. 14A is an enlarged cross-sectional view showing the partial internal shape of the honeycomb structure forming die shown in FIGS. 2A and 2B, and corresponds to FIG. 3.
Figure 14B:
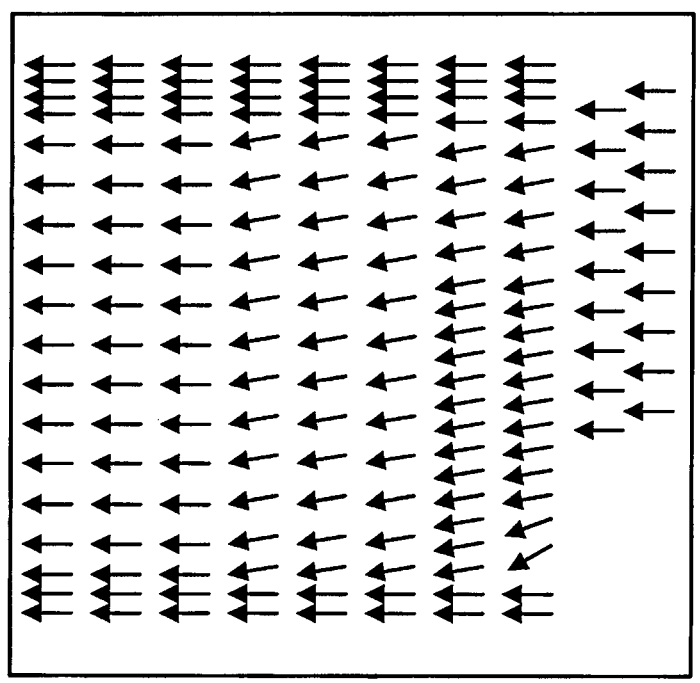
FIG. 14B is a schematic diagram showing a flow speed distribution of the material in the forming step of the honeycomb structure in a broken line frame XIVB shown in FIG. 14A.
Figure 15A:
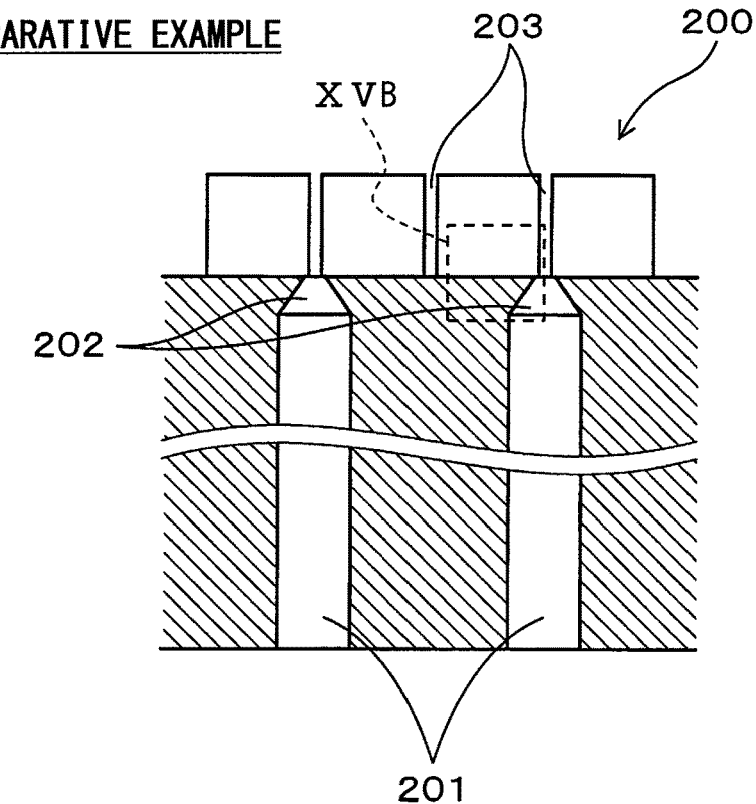
FIG. 15A is an enlarged cross-sectional view showing a partial internal shape of the honeycomb structure forming die according to the comparative example shown in FIG. 12.
Figure 15B:
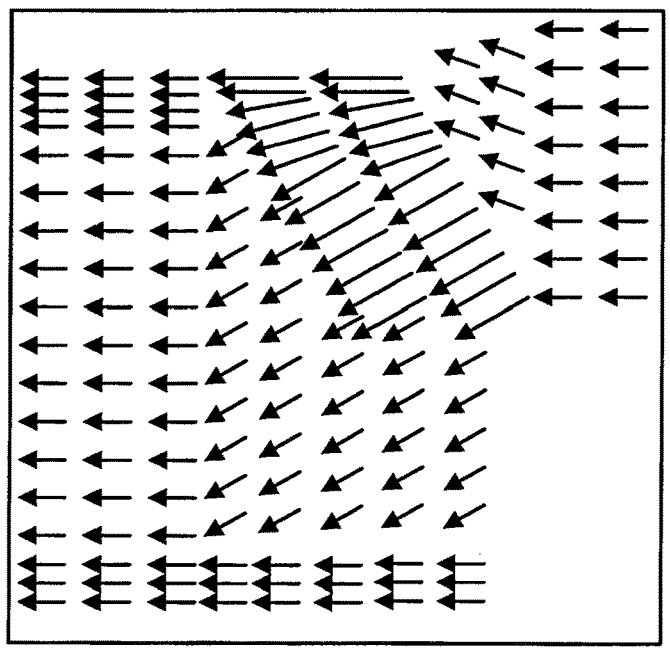
FIG. 15B is a schematic diagram showing a flow speed distribution of a material in a forming step of a honeycomb structure in a broken line frame XVB shown in FIG. 15A.

A difference between effects of the die 1 of the present embodiment and effects of the die 200 as the conventional die is now described with comparison based on simulation results of the flow of the ceramic material. FIG. 14A shows a cross-sectional view of the die 1 of the present embodiment. FIG. 14B shows a simulation result of the flow of the ceramic material in the die 1. FIG. 15A shows a cross-sectional view of the die 200 of the comparative example. FIG. 15B shows a simulation result of the flow of the ceramic material in the die 200.

As can be seen from FIG. 14B, the flow of the ceramic material from the throttle hole 22 and the guide hole 23 toward the slit 31 is substantially uniform without a considerable change of the flow direction and speed in the die 1. On the other hand, as shown in FIG. 15B, the flow of the ceramic material temporarily changes inward from the material supply hole 201 toward the end 202 having a tapered shape, and then considerably changes outward in the die 200. Moreover, the flow speed of the ceramic material is high on the inner side and low on the outer side, under which condition the flow does not become uniform.

Figure 16:
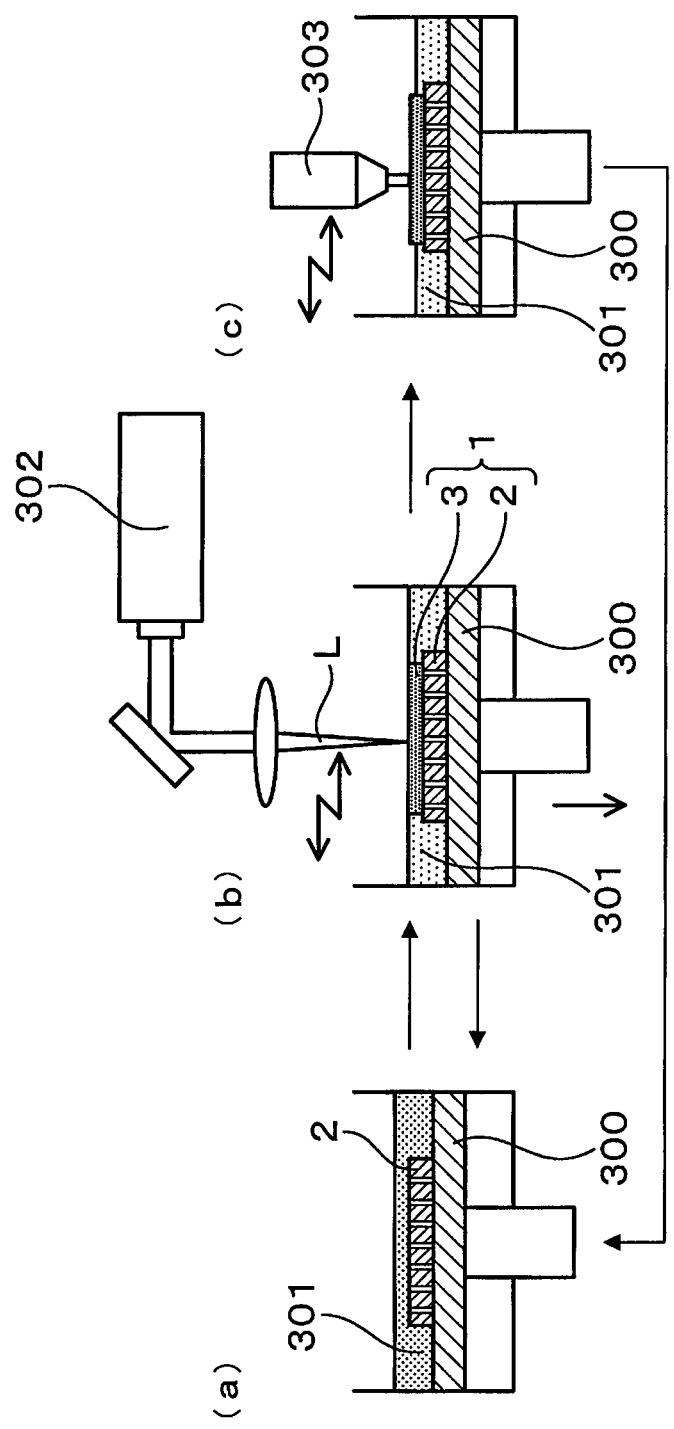
FIG. 16 is a schematic view showing a manufacturing process of the honeycomb structure forming die according to the first embodiment.

For example, the die 1 can be manufactured by a three-dimensional metal laminating molding method which sinters metal powder with laser using a 3D printer. Accordingly, the die 1 may be constituted by a laminate body which has a plurality of layers obtained by melting and solidifying metal powder. As shown in FIG. 16, the 3D printer has a pedestal 300 which is movable and constitutes a bottom of the container-shaped apparatus. The three-dimensional metal laminating molding method lays metal powder on the pedestal 300 (powder laying step), applies laser beams to the metal powder to melt and solidify the metal powder (laser processing step), and performs shaping by cutting (cutting step).

According to the present embodiment, the slit portion 3 is formed such that the slit portion 3 can be laminated on the material supply portion 2 after formation of the material supply portion 2. FIG. 16 shows a state that the material supply portion 2 after three-dimensional formation is disposed on an upper surface of the pedestal 300. A powder laying step (a), a laser processing step (b), and a cutting step (c) in FIG. 16 schematically show an example of a manufacturing step of the die 1 using a 3D printer.

In the powder laying step (a), the material supply portion 2 is filled and covered with metal powder 301. For example, the metal powder 301 is fine powder of a steel material such as stainless steel.

In the laser processing step (b), a laser beam L is applied to a desired portion of the metal powder 301 using a laser irradiation device 302 to melt and solidify this portion. For example, a layer of the metal powder 301 melted and solidified by one laser irradiation has a thickness of approximately 0.05 mm. At this time, the pedestal 300 is lowered by 0.05 mm corresponding to the thickness of the layer of the melted and solidified metal powder 301. Subsequently, the powder laying step (a) is again performed. By repeating the powder laying step (a) and the laser processing step (b) ten times, for example, the thickness of the layer of the melted and solidified metal powder 301 becomes 0.5 mm in total, wherefore the pedestal 300 is lowered by 0.5 mm in total.

When the thickness of the layer of the melted and solidified metal powder 301 reaches a predetermined thickness, cutting is performed using a cutting tool 303 in the cutting step (c). The cutting step (c) achieves shaping to smooth unevenness of the inner wall surfaces of the supply taper hole 24, the material supply hole 21, the throttle hole 22, the guide holes 23, and the slit 31.

As described above, by repeating the powder laying step (a), the laser processing step (b), and the cutting step (c), the melted and solidified metal layers are laminated to produce the die 1.

The thickness and shape of each layer of the metal powder 301 melted and solidified by one laser irradiation are analyzed in advance based on three-dimensional data indicating the shape of the die 1. Specifically, the thickness and shape of each layer are determined considering the die body 11 as a laminate body of a plurality of layers divided in the thickness direction (extrusion direction X). Each layer having desired thickness and shape is formed by controlling the laser irradiation device 302 in accordance with the thickness and shape of the layer.

According to the present embodiment, the material supply portion 2 is formed by solidifying the metal powder 301 in an area other than portions corresponding to the supply taper hole 24, the material supply hole 21, the throttle hole 22, and the guide holes 23 in the laser processing step (b). Subsequently, the slit portion 3 is formed by melting and solidifying the metal powder 301 laid in an area other than a portion corresponding to the slit 31. In this manner, formation of the die 1 is completed. According to the present embodiment, the die 1 is a laminated body formed by laminating a plurality of layers. Accordingly, the inner surfaces of the supply taper hole 24, the material supply hole 21, the throttle hole 22, the guide holes 23, and the slit 31 each formed inside the die 1 are allowed to have smooth surfaces which are also continuous surfaces connected seamlessly.

Figure 17:
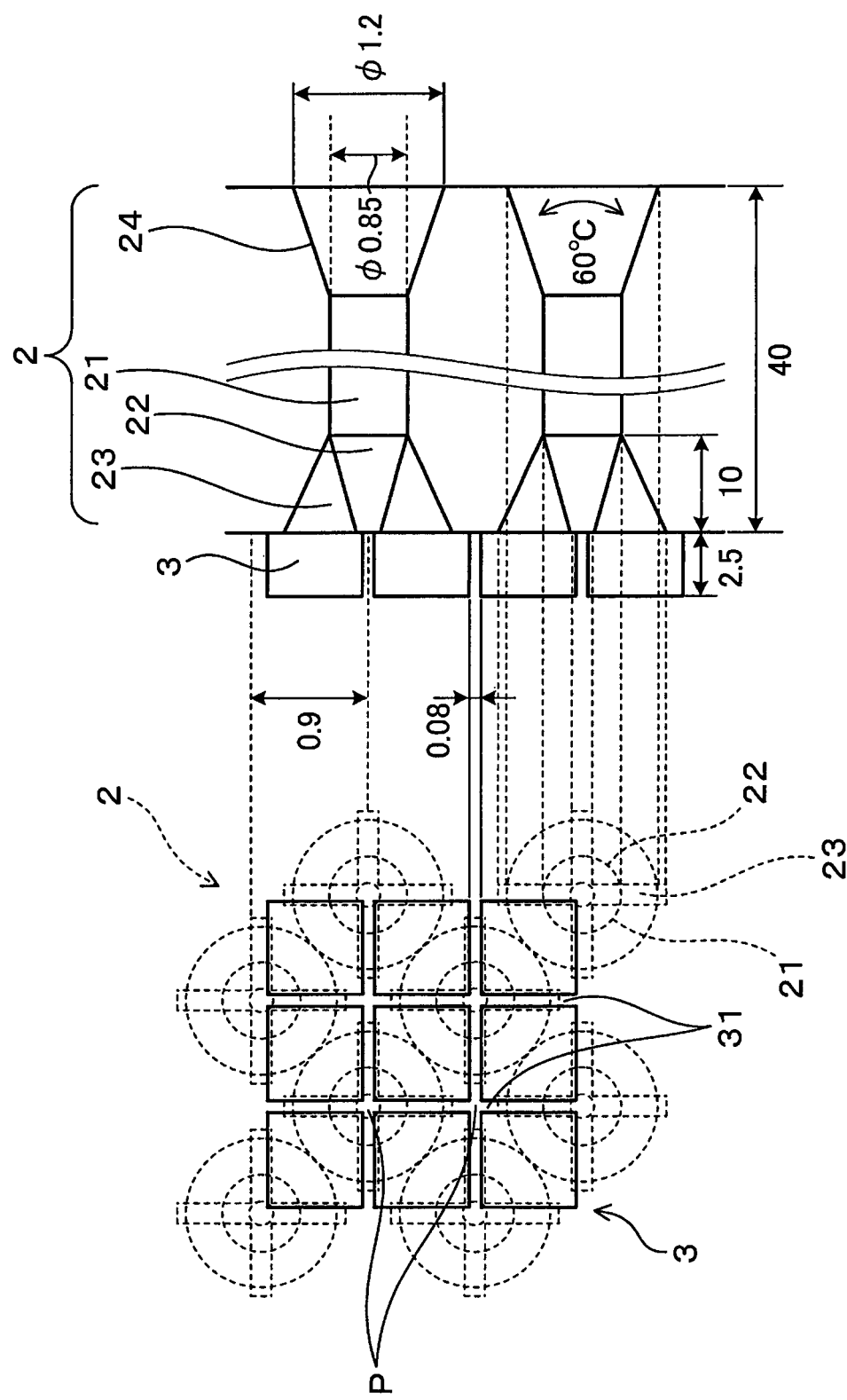
FIG. 17 is a partially enlarged view showing a cell shape of the honeycomb structure shown in FIG. 5, and a schematic cross-sectional view of a honeycomb structure forming die used for forming the honeycomb structure.

According to the die 1, the width of each slit formed in the slit portion 3 is 0.08 mm, and the distance between the two adjoining grid points P is 0.9 mm, for example, as shown in FIG. 17. These values correspond to the cell wall thickness and the cell pitch of the honeycomb structure H, respectively. In addition, according to one example, the total length of the die body 11 is 40 mm, the length of the throttle hole 22 is 10 mm, and the length of the slit 31 is 2.5 mm in the thickness direction, and the diameter of the material supply hole 21 is 0.85 mm, the diameter of the supply taper hole 24 is 1.2 mm, and the taper angle of the supply taper hole 24 is 60 degrees. The die 1 can uniformly supply the ceramic material from the material supply portion 2 which has a small hole diameter as described above, to the slit portion 3 which is minute, to manufacture the honeycomb structure H having thin walls with excellent formability.

Second Embodiment

Figure 18:
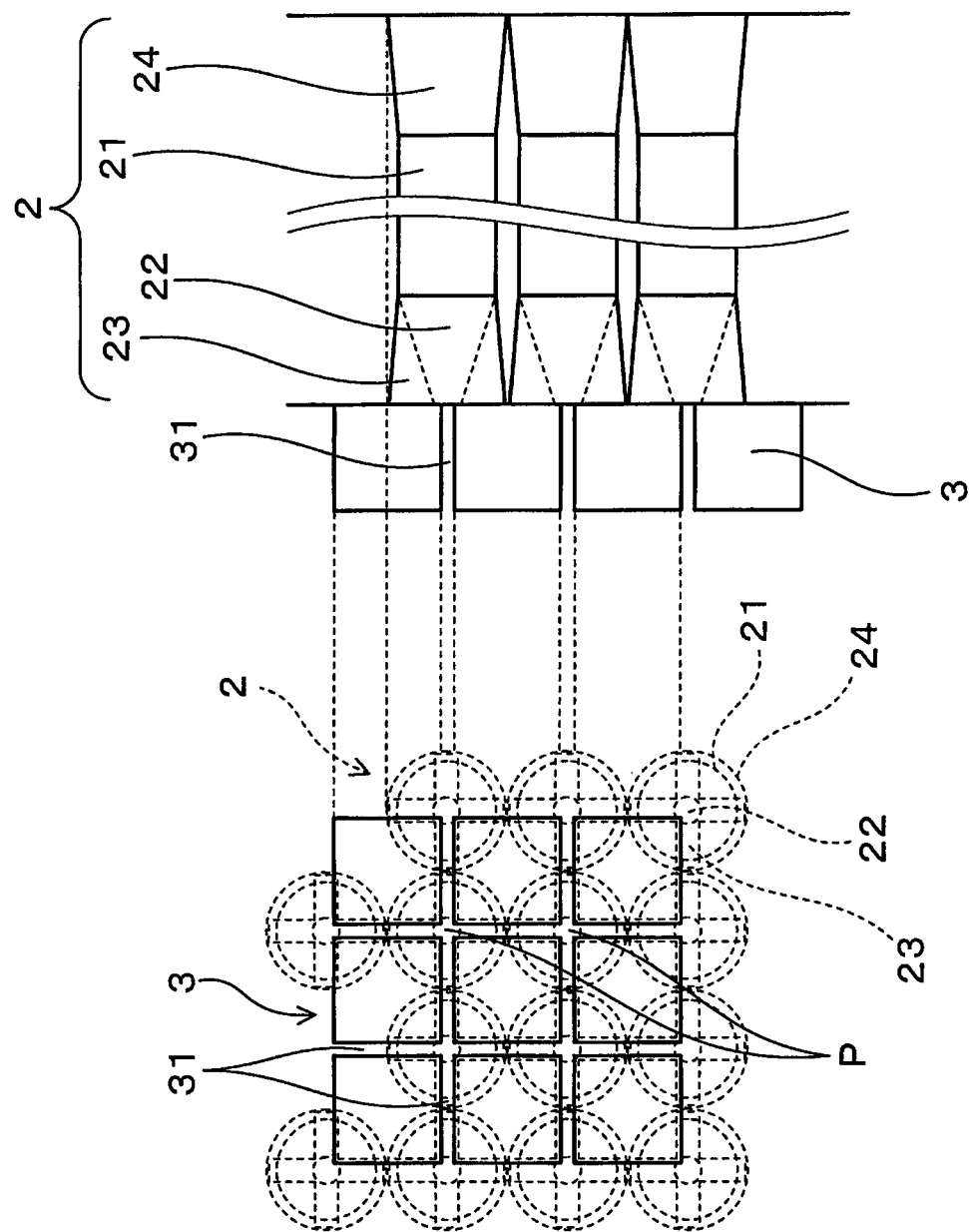
FIG. 18 is a partially enlarged view showing a cell shape of a honeycomb structure, and a schematic cross-sectional view of a honeycomb structure forming die used for forming the honeycomb structure according to a second embodiment.

According to the die 1 presented in the first embodiment, the material supply hole 21 of the material supply portion 2 is disposed at every other point of the grid points P of the slit 31 of the slit portion 3 in the longitudinal and lateral directions. According to the present embodiment, however, the material supply holes 21 are disposed at all the grid points P of the slit 31, for example, as shown in FIG. 18. According to the present embodiment, the supply taper hole 24 connected to the material supply hole 21 opens to the material supply surface 12, and the throttle hole 22 opens to the grid point P of the slit 31. In addition, the four guide holes 23 extend outward from the throttle hole 22, similarly to the first embodiment.

The hole diameters of the material supply hole 21 and the supply taper hole 24, the lengths of the material supply hole 21 and the supply taper hole 24 in the thickness direction, and others may be set to appropriate values providing sufficient rigidity of the die 1. The die 1 of the present embodiment can also be manufactured with high accuracy using a 3D printer as described above. The structure and material of the die 1 in other points are similar to those in the first embodiment, and the same description is not repeated. The honeycomb structure H having thin walls can be similarly manufactured with excellent formability by uniform supply of material using the die 1 of the present embodiment.

Third Embodiment

Figure 19A:
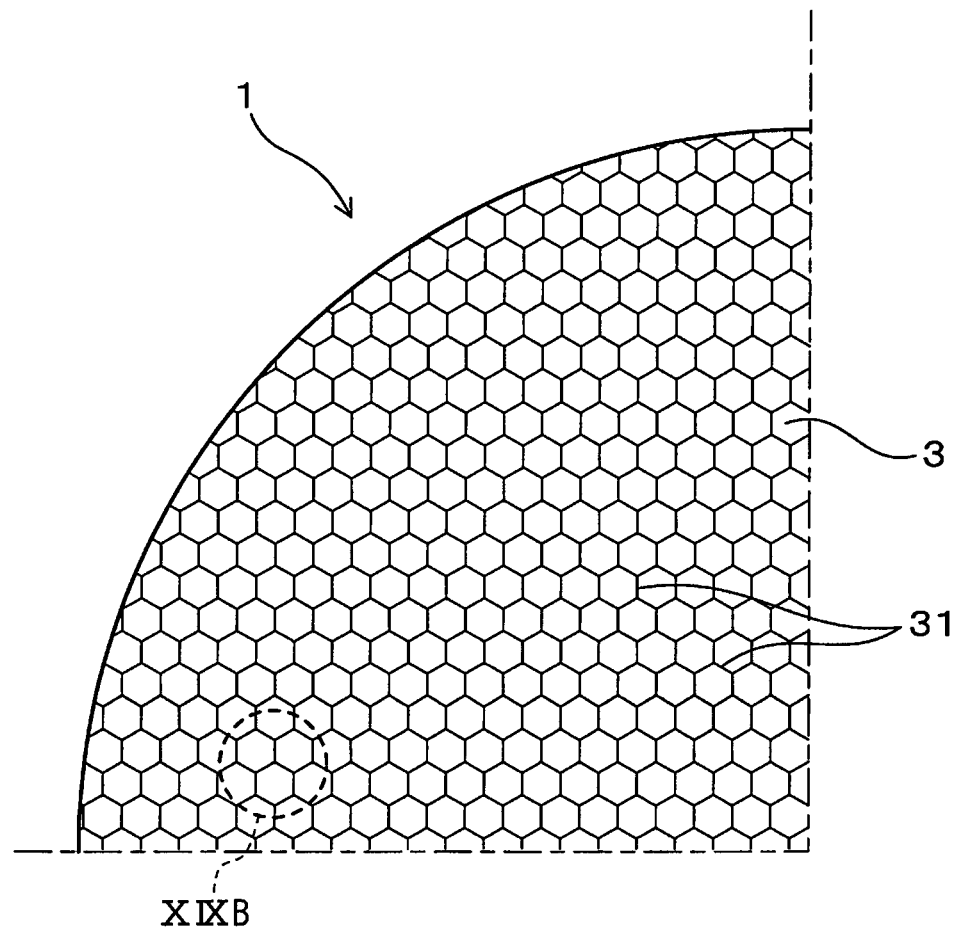
FIG. 19A is a partial cross-sectional view showing a cell shape of a honeycomb structure according to a third embodiment.
Figure 19B:
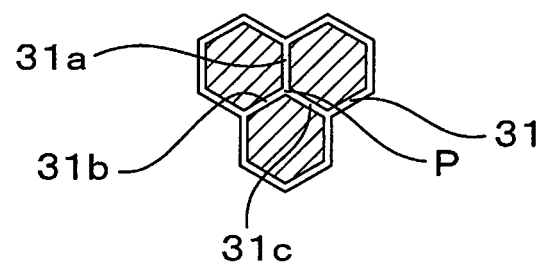
FIG. 19B is an enlarged view of a broken line frame XIXB shown in FIG. 19A.

According to the first embodiment and the second embodiment, the grid shape of the slit 31 of the slit portion 3 is a quadrangular shape. According to a third embodiment, each grid shape of the slit 31 is a hexagon shape as shown in FIG. 19A. In other words, each of the plurality of cells C has a hexagonal shape in the cross section. According to the present embodiment, three slit grooves 31a, 31b, and 31c extend from one grid point P of the slit 31 as shown in FIG. 19B. All of the plurality of cells C have the same cross-sectional area.

According to the present embodiment, the supply taper hole 24 connected to the material supply hole 21 opens to the material supply surface 12, and the throttle hole 22 opens to the grid point P of the slit 31, similarly to the first embodiment and the second embodiment. According to the first embodiment and the second embodiment, the four guide holes 23 extend outward from the throttle hole 22. In the present embodiment, however, the three guide holes 23 corresponding to the three slit grooves 31a, 31b, and 31c extend outward from the throttle hole 22. More specifically, the three guide holes 23 are equally disposed at three positions outside the throttle hole 22, and extend radially outward from the throttle hole 22 to uniformly supply the ceramic material to the three slit grooves 31a, 31b and 31c.

The honeycomb structure H having thin walls can be similarly manufactured with excellent formability by uniform supply of the ceramic material using the die 1 of the present embodiment. The structure, material, and the like of the die 1 in other points are similar to those in the first embodiment, and the same description is not repeated.

Fourth Embodiment

Figure 20A:
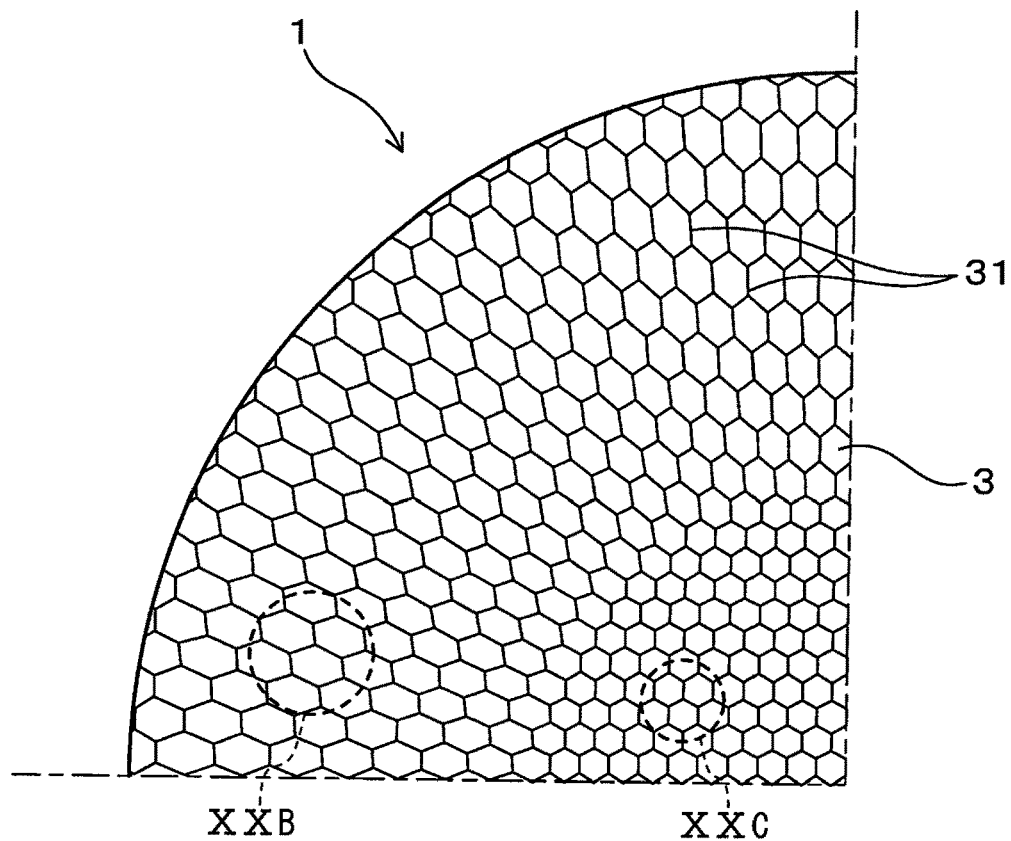
FIG. 20A is a partial cross-sectional view showing a cell shape of a honeycomb structure according to a fourth embodiment.
Figure 20B:
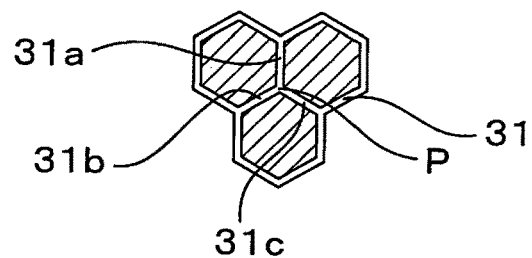
FIG. 20B is an enlarged view of a broken line frame XXB shown in FIG. 20A.
Figure 20C:
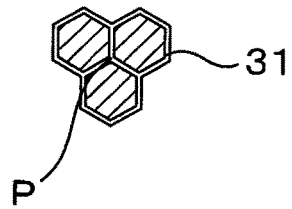
FIG. 20C is an enlarged view of a broken line frame XXC shown in FIG. 20A.

According to the first, second, and third embodiments, the cross-sectional shape of each of the plurality of cells C is a square or hexagon shape. According to a fourth embodiment, each shape of the plurality of cells C has a hexagon shape similarly to the third embodiment, but has a different cross-sectional area as shown in FIGS. 20A, 20B, and 20C. Specifically, each cross-sectional area of the plurality of cells C gradually increases from an inner peripheral portion to an outer peripheral portion of the slit 31. For example, a cell C having an enlarged cross-sectional area may have a shape deformed from a regular hexagonal shape as shown in FIG. 20A.

According to the present embodiment, the supply taper hole 24 connected to the material supply hole 21 opens to the material supply surface 12, the throttle hole 22 opens to the grid point P of the slit 31, and the three guide holes 23 extend outward from the throttle hole 22 similarly to the third embodiment. The honeycomb structure H having thin walls can be similarly manufactured with excellent formability by uniform supply of the ceramic material using the die 1 of the present embodiment. Moreover, the desired shape of the honeycomb structure H can be easily produced by providing the plurality of cells C whose cross-sectional areas in the inner peripheral portion are different from the cross-sectional areas in the outer peripheral portion.

Fifth Embodiment

Figure 21:
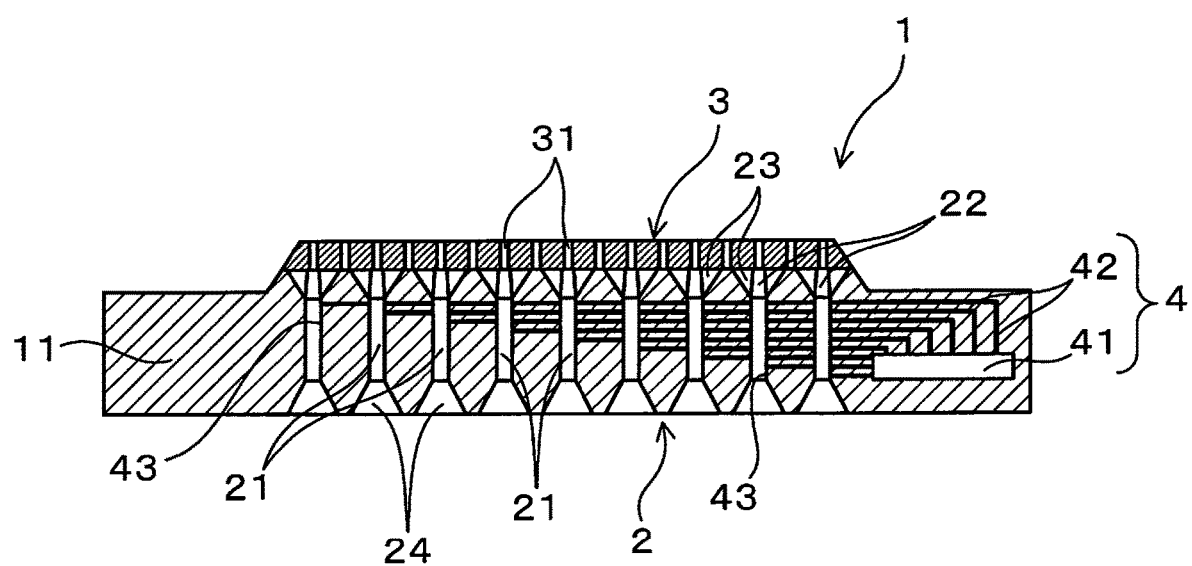
FIG. 21 is a top view of a honeycomb structure forming die according to a fifth embodiment, and corresponds to FIG. 2A.

As shown in FIG. 21, a water supply device 4 for supplying water to the material supply portion 2 may be attached to the die 1 having the configuration of any of the first, second, third, and fourth embodiments. For example, the water supply device 4 includes a water reservoir 41 provided in an outer peripheral portion of the die body 11 which does not have the slit 31, and a plurality of water channels 42 connecting the water reservoir 41 and the material supply holes 21. One end of each of the plurality of water channels 42 is connected to the water reservoir 41, while the other end of each of the plurality of water channels is connected to the corresponding one of the plurality of material supply holes 21. The other end of each of the plurality of water channels 42 has a water inlet 43 opening to the inner circumferential side surface of the corresponding material supply hole 21. Water stored in the water reservoir 41 flows through the water channels 42, and is supplied from the water inlets 43 into the material supply holes 21. The water reservoir 41 communicates with a not-shown water supply path outside the die body 11.

According to the present embodiment, an appropriate amount of water is supplied from each of the water channels 42 to the inside of the corresponding material supply hole 21 during extrusion molding, wherefore a coefficient of friction between the ceramic material and the die 1 can be significantly reduced. Accordingly, when compared at the same molding speed, an effect of reducing molding pressure can be exerted unlike a case of no water supply.

Each of the plurality of water channels 42 only need be disposed such that the water channel 42 passes through a portion where no material supply hole 21 of the die body 11 is formed, and opens to the corresponding material supply hole 21. The shapes of the water channels 42 and the opening positions of the water channels 42 to the material supply holes 21 can be set to appropriate shapes and positions. The die 1 including the water supply device 4 described above can also be manufactured by the method using the 3D printer as described above.

Other Embodiments

The present disclosure is not limited to the embodiments described herein. The embodiments may be modified in appropriate manners without departing from the scope and spirit of the present disclosure. The respective embodiments described herein are not embodiments unrelated to each other, and therefore can be appropriately combined unless such combinations are obviously inappropriate. Elements constituting the respective embodiments are not necessarily essential unless clearly expressed as particularly essential, or considered as obviously essential in principle, for example.

Concerning values such as numbers of the constituent elements, numerical values, quantities, and ranges in the respective embodiments, the numerical values of the constituent elements are not limited to specific values unless clearly expressed as particularly essential, or considered as obviously limited to the specific values in principle, for example. According to the respective embodiments described above, materials, shapes, positional relationships, or others of the constituent elements and the like described in the embodiments are not limited to specific examples unless clearly expressed, or limited to the specific materials, shapes, positional relationships, or others in principle.

(1) According to the embodiments described above, the honeycomb structure H has a cylindrical shape. However, the external shape of the honeycomb structure H may be an elliptical shape, a racetrack shape, or the like, for example. The external shapes of the material supply portion 2 and the slit portion 3 of the die 1 are also appropriately modified in correspondence with these shapes. Similarly, the shapes and the like of the material supply holes 21 of the material supply portion 2 and the slit 31 of the slit portion 3 may be appropriately modified in correspondence with the shape, wall thickness, and the like of the cells C of the honeycomb structure H.

(2) The honeycomb structure H manufactured with the die 1 can be used as a carrier for supporting a catalyst or the like mounted on an automobile to purify exhaust gas, for example.

What is claimed is:

1. A honeycomb structure forming die used for extrusion molding of a honeycomb structure that has a plurality of cells partitioned by cell walls, the honeycomb structure forming die comprising:
   a die body;
   a material supply portion including
      a material supply surface that forms one surface of the die body, and
      a material supply hole that extends in an extrusion direction from the material supply surface; and
   a slit portion including
      an extrusion surface that faces the material supply surface across the material supply hole, and
      a slit that has a grid shape, opens on the extrusion surface, and communicates with the material supply hole inside the die body, wherein
   the slit has a grid point,
   the material supply hole is provided at a position corresponding to the grid point and coaxially with the grid point,
   an end of the material supply hole in the extrusion direction includes
      a throttle hole whose diameter decreases toward the grid point, and
      a guide hole that extends outward from the throttle hole and guides a material to the slit including the grid point,
   the slit includes a slit groove that extends from the grid point,
   the guide hole is defined between a pair of surfaces that face each other across the slit groove, and
   each surface of the pair of surfaces has a shape whose width increases in the extrusion direction.

2. The honeycomb structure forming die according to claim 1, wherein
   the guide hole includes
      a first opening that opens on an inner circumferential surface of the throttle hole and extends along the inner circumferential surface, and
      a second opening that opens to the slit.

3. The honeycomb structure forming die according to claim 1, wherein
   the material supply hole includes a supply taper hole that is located at an end adjacent to the material supply surface, and
   the supply taper hole has a tapered cross section whose diameter increases toward the material supply surface.

4. The honeycomb structure forming die according to claim 1, wherein
   inner surfaces of the material supply hole, the throttle hole, and the guide hole have a smooth curved surface or flat surface, the inner surfaces being smoothly connected to each other.

5. The honeycomb structure forming die according to claim 1, wherein
   the slit has a polygonal grid shape,
   the slit includes
      a plurality of grid points, and
      a plurality of slit grooves each of which extends between two adjoining grid points of the plurality of grid points, and
   the material supply guide hole is provided for each of the plurality of slit grooves.

6. A method of manufacturing the honeycomb structure forming die according to claim 1, the material supply hole and the slit being formed in the honeycomb structure forming die, the method comprising:
   laying metal powder on a pedestal; and
   applying a laser beam to the metal powder to melt and solidify the metal powder in an area other than portions corresponding to the material supply hole and the slit.

* * * * *